(12) United States Patent
Wang et al.

(10) Patent No.: US 10,708,578 B2
(45) Date of Patent: Jul. 7, 2020

(54) ADJUSTING DEVICE, 3D DISPLAY APPARATUS AND METHOD FOR CONTROLLING THE SAME

(71) Applicant: BOE TECHNOLOGY GROUP CO., LTD., Beijing (CN)

(72) Inventors: Hong Wang, Beijing (CN); Xiaochen Niu, Beijing (CN); Jinye Zhu, Beijing (CN); Zhongxiao Li, Beijing (CN); Yaoqiu Jing, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 164 days.

(21) Appl. No.: 15/656,826

(22) Filed: Jul. 21, 2017

(65) Prior Publication Data
US 2018/0063521 A1 Mar. 1, 2018

(30) Foreign Application Priority Data
Aug. 31, 2016 (CN) .......................... 2016 1 0791229

(51) Int. Cl.
| | |
|---|---|
| *H04N 13/00* | (2018.01) |
| *H04N 13/398* | (2018.01) |
| *H04N 13/371* | (2018.01) |
| *H04N 13/366* | (2018.01) |
| *G02B 30/27* | (2020.01) |
| *H04N 13/305* | (2018.01) |
| *H04N 13/383* | (2018.05) |
| *G02B 7/00* | (2006.01) |

(52) U.S. Cl.
CPC ........... *H04N 13/398* (2018.05); *G02B 7/005* (2013.01); *G02B 30/27* (2020.01); *H04N 13/305* (2018.05); *H04N 13/366* (2018.05); *H04N 13/371* (2018.05); *H04N 13/383* (2018.05); *H04N 2213/001* (2013.01)

(58) Field of Classification Search
CPC .. H04N 13/398; H04N 13/305; H04N 13/371; H04N 13/383; H04N 13/366; H04N 2213/001; G02B 7/005; G02B 27/2214
See application file for complete search history.

(56) References Cited

U.S. PATENT DOCUMENTS

2014/0162798 A1* 6/2014 Kim ...................... A63B 69/36
473/132

FOREIGN PATENT DOCUMENTS

| CN | 102033324 A | 4/2011 |
|---|---|---|
| CN | 102350463 A | 2/2012 |
| CN | 204915355 U | 12/2015 |
| CN | 105852610 A | 8/2016 |

OTHER PUBLICATIONS

First Chinese Office Action, for Chinese Patent Application No. 201610791229.0, dated Mar. 15, 2018, 11 pages.

\* cited by examiner

*Primary Examiner* — Frank F Huang
(74) *Attorney, Agent, or Firm* — Kinney & Lange, P.A.

(57) ABSTRACT

Embodiments of the present disclosure provide an adjusting device, a 3D display apparatus and a method for controlling the 3D display apparatus. The adjusting device is configured to adjust a position of a member to be moved in a display apparatus, the adjusting device including: a supporting portion which has a groove on a side of the supporting portion adjacent to the member to be moved; and a rotatable portion which is partly embedded in the groove of the supporting portion and is rotatable in the groove.

10 Claims, 6 Drawing Sheets

ADJUSTING DEVICE, 3D DISPLAY APPARATUS AND METHOD FOR CONTROLLING THE SAME

CROSS REFERENCE TO RELATED APPLICATION

This application claims benefit of the Chinese Patent Application No. 201610791229.0, filed with SIPO on 31 Aug. 2016, which is incorporated herein by reference in entirety.

BACKGROUND OF THE DISCLOSURE

Field of the Disclosure

The present disclosure relates to the field of display technology, and in particular, to an adjusting device, a 3D display apparatus and a method for controlling the 3D display apparatus.

Description of the Related Art

At present, 3D (three-dimensional) display becomes popular with many customers due to its vivid expression, graceful environmental infectivity and strong visual impact.

The principle of 3D display is to cause the left eye and the right eye of a viewer to receive slightly different images, that is, a left image and a right image, respectively; the two images are combined by comprehensive analysis of the viewer's brain, so that the viewer can perceive depths of objects that a picture shows, to further produce three-dimension effect.

SUMMARY

An embodiment of the present disclosure provides an adjusting device configured to adjust a position of a member to be moved in a display apparatus, the adjusting device including: a supporting portion which has a groove on a side of the supporting portion adjacent to the member to be moved; and a rotatable portion which is partly embedded in the groove of the supporting portion and is rotatable in the groove.

In an embodiment, the adjusting device includes a plurality of the supporting portions spaced apart from each other, and at least one rotatable portion is embedded into each of the supporting portions; and wherein the adjusting device further includes: a substrate on which the plurality of the supporting portions are fixed.

In an embodiment, the supporting portion includes a supporting pillar or a supporting wall.

In an embodiment, the supporting portion is the supporting wall and the substrate has a rectangular shape and the supporting wall extends from one side of the substrate to the other opposite side.

In an embodiment, the rotatable portion includes a pulley, a ball or a roller.

In an embodiment, the adjusting device further includes a driving portion configured to drive the rotatable portion to rotate.

In an embodiment, the driving portion is arranged in the supporting portion.

An embodiment of the present disclosure provides a 3D display apparatus including: a display panel; and a grating composed of bars and arranged on a light exit side of the display panel, wherein the 3D display apparatus further includes the adjusting device as described in any one of the above embodiments, and the rotatable portion in the adjusting device is engaged with the member to be moved such that the rotatable portion drives the member to be moved to move in a direction along which the bars of the grating are arrayed, and wherein the member to be moved is the display panel or the grating.

In an embodiment, the adjusting device includes a microelectromechanical system adjusting device.

In an embodiment, the adjusting device includes a plurality of the supporting portions spaced apart from each other, and at least one rotatable portion is embedded into each of the supporting portions; and wherein the adjusting device further includes; a substrate on which the plurality of the supporting portions are fixed.

In an embodiment, the adjusting device is provided below the member to be moved such that the member to be moved is engaged with the rotatable portion in the adjusting device by gravity.

In an embodiment, the supporting portion and the rotatable portion in the adjusting device are arranged between the display panel and the grating.

In an embodiment, the adjusting device includes a substrate, and wherein one of the member to be moved and the substrate is the display panel, the other of them is the grating.

In an embodiment, the supporting portion and the rotatable portion in the adjusting device are arranged at a pixel definition region of the display panel.

In an embodiment, the 3D display apparatus further includes a stopper arranged on a side of the member to be moved engaged with the adjusting device and the supporting portion of the adjusting device is positioned in a moving range limited by the stopper.

In an embodiment, the stopper includes a first sub-stopper and a second sub-stopper arranged on both sides of the supporting portion respectively in the direction along which the bars of the grating are arrayed, and wherein a spacing between the first sub-stopper and the second sub-stopper is equal to a pitch of the grating.

In an embodiment, the 3D display apparatus includes a controller, which is connected to a driving portion and configured to control the driving portion to drive the rotatable portion to rotate.

In an embodiment, the 3D display apparatus further includes a camera, which is configured to trace a position of an eye of a human and connected to the controller, and wherein the controller is configured to calculate a moving orientation and a moving distance required for the grating or the display panel, on a basis of the position of the eye traced by the camera and the current positions of the grating and the display panel, to obtain a rotating orientation and number of turns of the rotatable portion.

An embodiment of the present disclosure provides a method for controlling a 3D display apparatus, including: acquiring a position of an eye of a human; calculating a moving orientation and a moving distance required for a grating or a display panel, on a basis of the acquired position of the eye and the current positions of the grating and the display panel; and controlling the grating or the display panel to move in a direction along which bars of the grating are arrayed on a basis of the calculated moving orientation and moving distance required for the grating or the display panel.

In an embodiment, the 3D display apparatus includes: a display panel; and a grating composed of bars and arranged on a light exit side of the display panel, wherein the 3D display apparatus further includes the adjusting device configured to adjust a position of a member to be moved in the 3D display apparatus, the adjusting device including: a supporting portion which has a groove on a side of the supporting portion adjacent to the member to be moved; and a rotatable portion which is partly embedded in the groove of the supporting portion and is rotatable in the groove, wherein the rotatable portion in the adjusting device is engaged with the member to be moved such that the rotatable portion drives the member to be moved to move in a direction along which the bars of the grating are arrayed, and wherein the member to be moved is the display panel or the grating.

BRIEF DESCRIPTION OF DRAWINGS

In order to explain technical solutions of embodiments in the present disclosure or in the prior art amore clearly, the drawings for the embodiments will be described briefly below. Apparently, the following drawings show only some of embodiments in the present disclosure. From these drawings, the skilled person in the art may also obtain other drawings without any creative efforts.

DETAILED DESCRIPTION OF THE DISCLOSURE

The technical solutions of embodiments of the present disclosure will below be explained clearly and entirely with reference to drawings. Apparently, the explained embodiments are only part of embodiments of the present disclosure, instead of all of embodiments. All of other embodiments that can be obtained by the skilled person in the art, without any creative efforts, based on the embodiments of the present disclosure, shall fall within the protection scope of the present disclosure.

Figure 1:
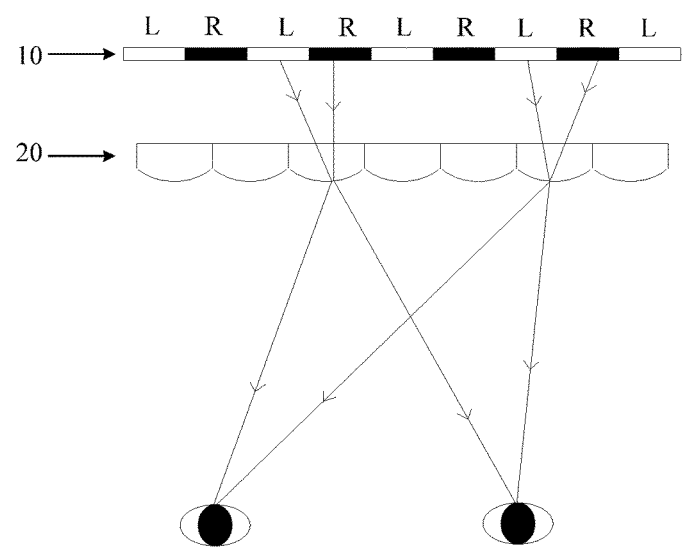
FIG. 1 is a schematic view showing a structure of a 3D display apparatus.

In the naked eyes 3D display technology, a grating is placed in front of a display panel, as illustrated in FIG. 1. As an example, FIG. 1 schematically shows one cylindrical lens grating arranged in front of the display panel 10. In this way, the light emitted from the display panel 10 passes through a grating 20 and then one part of the light reaches the left eye of the viewer while another part of the light reaches the right eye of the viewer. Due to difference in images seen by the left eye and the right eye, the naked eyes 3D display may be achieved.

In accordance with a generic concept, an embodiment of the present disclosure provides an adjusting device configured to adjust a position of a member to be moved in a display apparatus, the adjusting device including: a supporting portion which has a groove on a side of the supporting portion adjacent to the member to be moved; and a rotatable portion which is partly embedded in the groove of the supporting portion and is rotatable in the groove.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
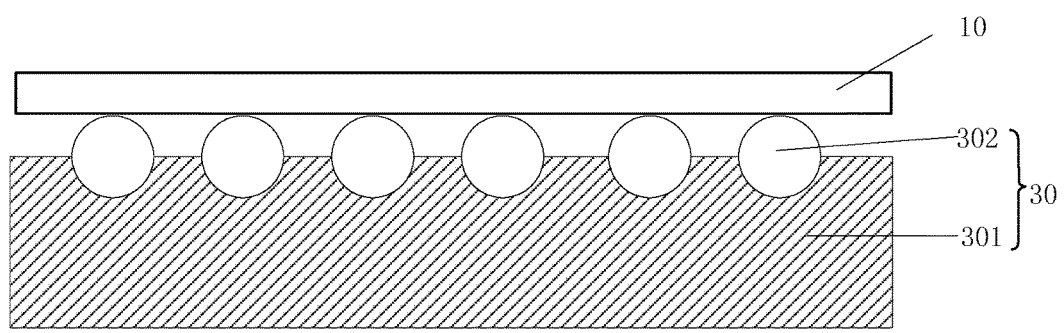
FIG. 2 is a schematic view showing a structure of an adjusting device according to an embodiment of the present disclosure.

An embodiment of the present disclosure provides an adjusting device 30 configured to adjust a position of a member to be moved in a display apparatus. As shown in FIG. 2, the adjusting device 30 includes: a supporting portion 301 and a rotatable portion 302. The supporting portion 301 has a groove on a side of the supporting portion adjacent to the member to be moved (below for sake of brevity, abbreviated as the member sometimes). The rotatable portion 302 is partly embedded in the groove of the supporting portion 301 and is rotatable in the groove.

It should be noted that, at first, it is not intended to limit the types of the supporting portion 301, for example, the supporting portion 301 may include a supporting part, a supporting wall or a supporting plate, and so on.

It is not intended to limit the number of the groove arranged on the supporting portion 301 and the number thereof may be provided as required. In each groove, one rotatable portion 302 may be embedded.

Secondly, it is not intended to limit structures of the rotatable portion 302 as long as the rotatable portion 302 can be rotated in the groove of the supporting portion 301. For example, the rotatable portion 302 may include a pulley, a ball or a roller, and so on.

Herein, when the position of the member to be moved in the display apparatus is adjusted by the adjusting device 30, there is a friction force between the rotatable portion 302 and the member to be moved in the adjusting device 30 and the friction force may drive the member to move. In view of this, when the rotatable portions 302 in the adjusting device 30 rotate towards the same direction, the member in contact with the rotatable portion 302 of the adjusting device 30 (the member is the display panel 10 in the example shown in FIG. 2) may move correspondingly. The moving orientation of the member is related to the rotating orientation of the rotatable portion 302. As shown in FIG. 2, if the rotatable portions 302 rotate clockwisely, the member moves towards the right; if the rotatable portions 302 rotate anti-clockwisely, the member moves towards the left. In addition, the moving distance of the member is related to the number of turns of the rotatable portion 302 and diameter of the rotatable portion 302. Further, it may control the rotating orientation and the number of turns of the rotatable portion 302 as required.

Thirdly, as the adjusting device 30 in the embodiment of the present disclosure is configured to adjust the position of the member in the display apparatus and the adjusting device 30 may be arranged in the display apparatus, the adjusting device 30 may have a size of millimeter level, micrometer level or nanometer level.

The embodiment of the present disclosure provides an adjusting structure 30 including the supporting portion 301 and the rotatable portion 302. The supporting portion 301 is provided with the groove thereon and the rotatable portion 302 is partly embedded in the groove, thus, when the rotatable portion 302 rotates in the groove, the member in contact with the rotatable portion 302 in the adjusting device 30 may be driven by the rotatable portion 302 to move correspondingly. When the adjusting device 30 is used in the 3D display apparatus, it may be used to move the grating 20 or the display panel 10, so as to adjust the direction of the light emitted from the display panel 10 after exiting from the grating 20, such that the 3D display apparatus achieves the best naked eyes 3D display at the plurality of positions.

By means of the adjusting device according to the embodiment of the present disclosure, the members such as the display panel 10 and the grating 20 in the display apparatus may move. In this way, the viewer may achieve the best naked eyes 3D display at the plurality of positions, to reduce the limitation of the position to application of the naked eyes 3D display and to improve the user's experiences.

Figure 3:
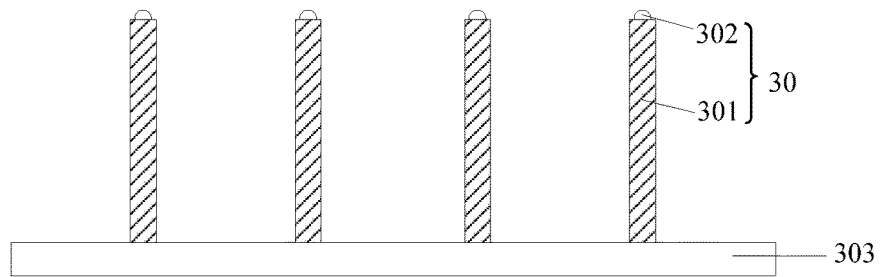
FIG. 3 is a first schematic view showing a structure of an adjusting device including a plurality of supporting portions according to an embodiment of the present disclosure.

As an example, as illustrated in FIG. 3, the adjusting device 30 includes a plurality of the supporting portions 301 spaced apart from each other, and at least one rotatable portion 302 is embedded into each of the supporting portions 301. The adjusting device 30 further includes: a substrate 303 on which the plurality of the supporting portions 301 are fixed.

In the example, it is not intended to limit the number of the supporting portions 301 in the adjusting device 30. More than two supporting portions 301 may be provided. In view of this, the number of the rotatable portion 302 embedded in each of the supporting portions 301 is also not limited. Not only one rotatable portion 302 may be embedded in each of the supporting portions 301, but also two or more rotatable portions 302 may be embedded in each of the supporting portions 301.

In the embodiment of the present disclosure, the adjusting device 30 includes a plurality of supporting portions 301, thus, on one hand, the adjusting device 30 may adjust the position of the member rapidly; on the other hand, the adjusting device 30 including the plurality of supporting portions 301 may keep constant distance between the member and the substrate 303 during moving the member, so as to ensure the member can move stably in entirety. In this way, the adjusting device 30 including the plurality of supporting portions 301 can prevent the member from being inclined during moving the member, rather than the adjusting device 30 including only one supporting 30.

As an example, the supporting portion 301 may include a supporting pillar or a supporting wall.

When the supporting portion 301 is the supporting pillar or the supporting wall, contact area between the supporting portion 301 and the member may be reduced in comparison with the case that the supporting 301 is a supporting plate. It may save the material for producing the supporting portion 301 to reduce the producing costs.

Figure 4:
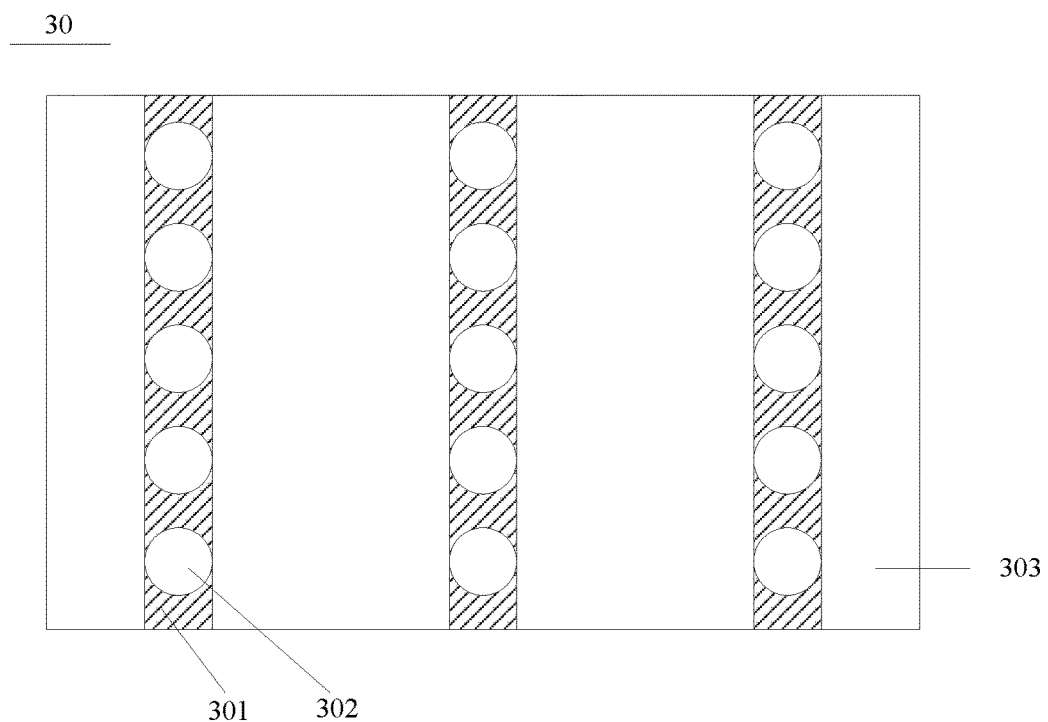
FIG. 4 is a second schematic view showing a structure of an adjusting device including a plurality of supporting portions according to an embodiment of the present disclosure.

Further, as illustrated in FIG. 4, when the supporting portion 301 is the supporting wall and the substrate 303 has a rectangular shape, the supporting wall extends from one side of the substrate 303 to the other opposite side.

It should be noted that when the substrate 303 has a shape of rectangle, the rectangle includes two groups of parallel opposite sides and the supporting wall may extend from any one side of the substrate 303 to the side parallel to it.

In the embodiment of the present disclosure, the supporting wall extends from one side of the substrate 303 to the other opposite side, thus, when the rotatable portion 302 on the supporting wall rotates, the friction three produced by the rotatable portion 302 may drive the member to move entirely in parallel. If the supporting wall has a small length along a direction parallel to any one side of the substrate 303, the part of the member in contact with the rotatable portion 302 will move at first when the rotatable portion 302 on the supporting wall rotates, so as to cause the member to be inclined.

Figure 5:
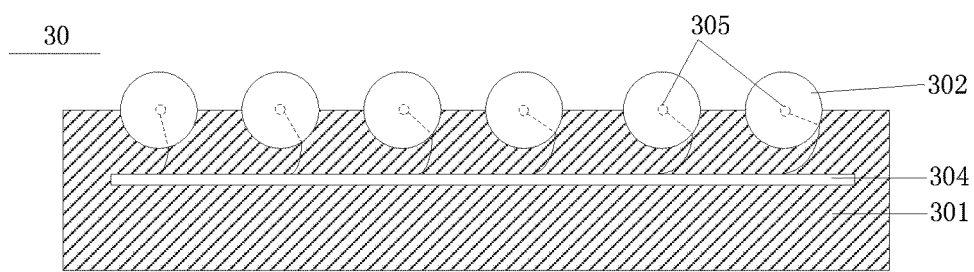
FIG. 5 is a schematic view showing another structure of an adjusting device according to an embodiment of the present disclosure.

As an example, as illustrated in FIG. 5, the adjusting device 30 further includes a driving portion 304 configured to drive the rotatable portion 302 to rotate.

It is not intended to limit the number of the driving portion 304 in the adjusting device 30. The adjusting device 30 may include one driving portion 304. All of the rotatable portions 302 are driven by one driving portion 304 to rotate. The adjusting device 30 may also include a plurality of driving portions 304. Each driving portion 304 may drive one or more rotatable portion(s) 302 to rotate.

It should be noted that it is not intended to limit how the driving portion 304 drives the rotatable portion 302 to rotate. For example, the driving portion 304 may drive the rotatable portion 302 to rotate by releasing static electricity. Or, the rotatable portion 302 is provided with a component driving the rotatable portion 302 to rotate, for example, a rotation shaft 305. The driving portion 304 is connected to the rotation shaft 305. When the driving portion 304 drives the rotation shaft 305 to rotate, the rotation shaft 305 may drive the rotatable portion 302 to rotate. In this case, the driving portion 304 may for example be a motor.

In view of this, it is not intended to limit the position of the driving portion 304. The driving portion 304 may be arranged in the supporting portion 301, or may be arranged outside the supporting portion 301.

In the embodiment of the present disclosure, the rotatable portion 302 may be driven by the driving portion 304 to rotate such that the member in contact with the rotatable portion 302 of the adjusting device 30 can be driven by the rotatable portion 302 to move.

Further as illustrated in FIG. 5, the driving portion 304 is arranged in the supporting portion 301.

In the embodiment of the present disclosure, when the driving portion 304 has a size less than the size of the supporting portion 301, the driving portion 304 may be arranged in the supporting portion 301. On one hand, the space occupied by the driving portion 304 may be reduced in comparison with the case that the driving portion 304 is arranged outside the supporting portion 301; on the other hand, the driving portion 304 is arranged in the supporting portion 301, and as the distance between the driving portion 304 and the rotatable portion 302 is relatively close, the rotatable portion 302 may be driven better to rotate.

Figure 6A:
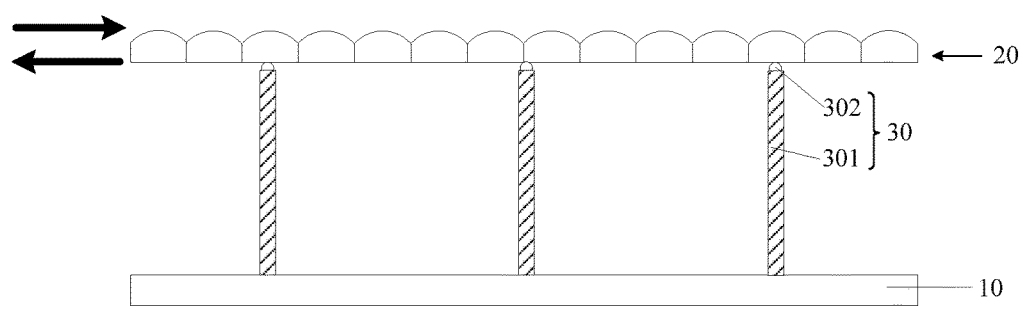
FIG. 6(a) is a first schematic view showing a structure of a 3D display apparatus according to an embodiment of the present disclosure.
Figure 6B:
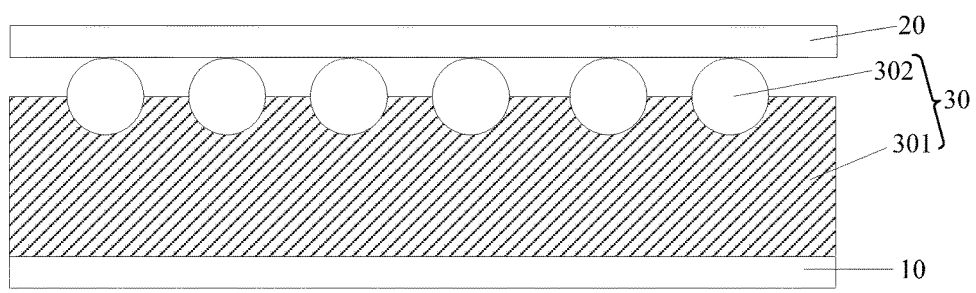
FIG. 6(b) is a second schematic view showing a structure of a 3D display apparatus according to an embodiment of the present disclosure.
Figure 6C:
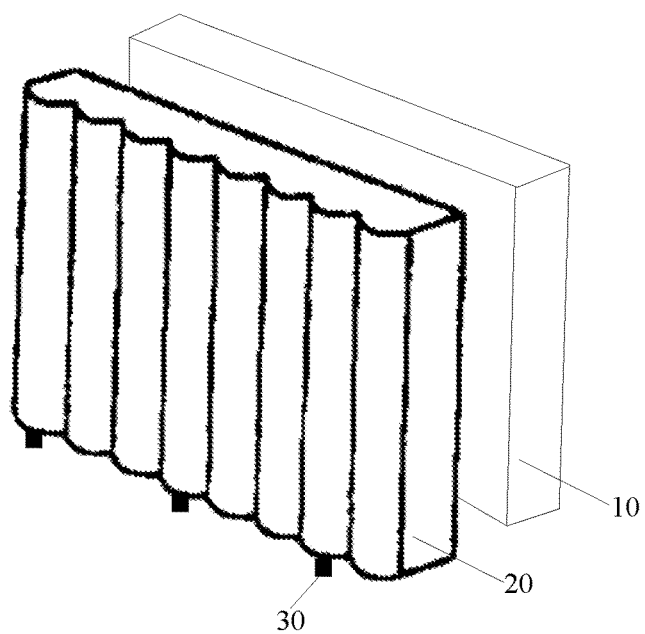
FIG. 6(c) is a third schematic view showing a structure of a 3D display apparatus according to au embodiment of the present disclosure.

An embodiment of the present disclosure provides a 3D display apparatus, as shown in FIG. 6(a) to FIG. 6(c). The 3D display apparatus includes a display panel 10 and a grating 20 composed of bars and arranged on a light exit side of the display panel 10 (in the example, the grating 20 is a cylindrical lens grating). As shown in FIG. 6(a), FIG. 6(b) and FIG. 6(c), the 3D display apparatus further includes the adjusting device 30 as described in the above embodiment, and the rotatable portion 302 in the adjusting device 30 is engaged with the member such that the rotatable portion 302 can drive the member to move in a direction along which the bars of the grating 20 are arrayed (for example a direction perpendicular to the extending direction of bars of the grating 20), and the member is the display panel 10 or the grating 20.

It should be noted that, at first, it is not intended to limit the type of the grating 20. For example, the grating 20 may be a slit gating. In this case, each of the bars is a bright stripe formed by a light transmission part or a dark strip formed by a light shielding part. Alternatively, the grating 20 may be a cylindrical lens grating. In this case, each of the bars is a cylindrical lens. Or, the grating 20 may also be a liquid crystal grating. In this case, each of the bars is a bright stripe or a dark stripe formed by liquid crystal molecules.

Secondly, the adjusting device 30 not only may move the display panel 10, but also may move the grating 20. It is not limited here.

In view of this, it is not intended to limit the position of the adjusting device 30 as long as the adjusting device 30 may move the display panel 10 or the grating 20. FIG. 6(a) to FIG. 6(c) schematically show the 3D display apparatus includes the display panel 10 and a grating 20, which is a cylindrical lens grating in this example. As shown in FIG. 6(a) and FIG. 6(b), the adjusting device 30 may be arranged between the display panel 10 and the grating 20, or may be arranged below the display panel 10 or the grating 20 (in the example shown in FIG. 6(c), the adjusting device 30 is arranged below the grating 20).

Thirdly, when the adjusting device 30 is arranged between the display panel 10 and the grating 20, the adjusting device 30 may also be configured to support the grating 20 while moving the grating 20 or the display panel 10, to keep a certain spacing between the grating 20 and the display panel 10, so as to achieve the naked eyes 3D display. In view of this, the height of the supporting portion 301 in the adjusting device 30 should be set reasonably depending on the distance between the grating 20 and the display panel 10 when the 3D display apparatus achieves 3D display.

Fourthly, the display panel 10 or the grating 20 moves in a direction along which bars of the grating 20 are arrayed. There are two moving directions here. In particular, as represented by bold arrow shown in FIG. 6(a), the display panel 10 or the grating 20 may move towards the left in the direction along which the bars of the grating 20 are arrayed or the display panel 10, or may move towards the right in the direction along which the bars of the grating 20 are arrayed.

In addition, FIG. 6(a) and FIG. 6(b) schematically show that the grating 20 is adjusted by the adjusting device 30 to move. The moving orientation of the grating 20 is related to the rotation orientation of the rotatable portion 302. If the rotatable portion 302 rotates clockwisely, the grating 20 will move towards the right; if the rotatable portion 302 rotates anti-clockwisely, the grating 20 will move towards the left. The moving orientation of the grating 20 may be adjusted by adjusting the rotating orientation of the rotatable portion 302.

Fifthly, it is not intended to limit the number of the adjusting device 30 arranged in the 3D display apparatus. Any number of the adjusting device 30 may be arranged depending on size of the display apparatus.

Sixthly, it is not intended to limit the type of the display panel 10. The display panel 10 may be a liquid crystal display (abbreviated as LCD) display panel, or may be an organic light emitting diode (abbreviated as OLED) display panel.

With reference to the case that the grating 20 is a cylindrical lens grating and the adjusting device 30 adjusts the grating 20 to move in the direction along which the bars of the grating 20 are arrayed (for example, in the direction perpendicular to the direction along which the bars of the grating 20 extend), the principle of the 3D display apparatus achieving the best naked eyes 3D display at a plurality of positions will be explained specifically below. The light emitted from the left eye image and the light emitted from the right eye image for the display panel 10 enter one cylindrical lens of the cylindrical lens grating 20, and are refracted by the cylindrical lens 201 towards the left eye and the right eye of the viewer respectively. The surface of the cylindrical lens is a curved surface, thus, when the cylindrical lens grating moves, the lights emitted from the display panel 10 are directed to different positions of the curved surface, such that the exit light has different directions after they are refracted by the cylindrical lens, thus they may be directed to different positions of the eyes to achieve the best naked eyes 3D display at different positions of the eyes of the human.

Figure 7A:
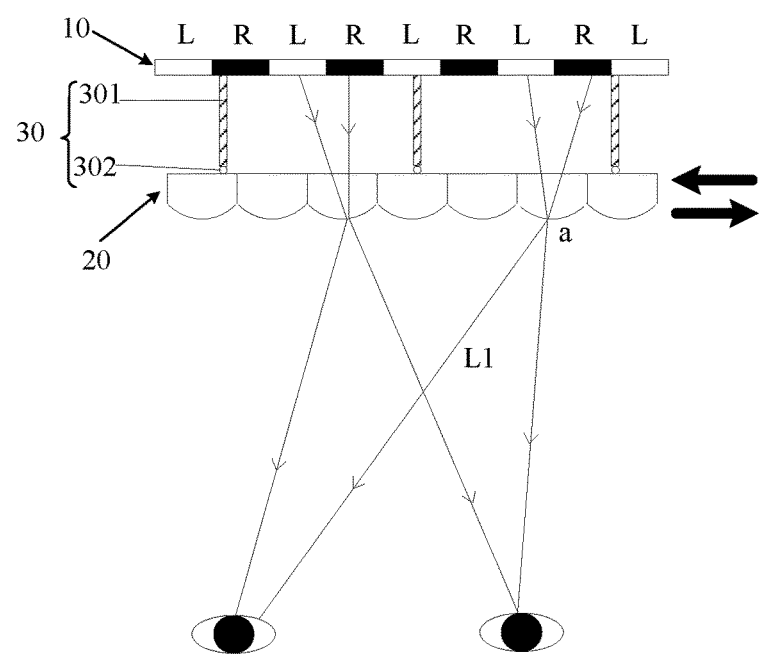
FIG. 7(a) is a first schematic view showing a principle of a 3D display apparatus that achieves the best naked eyes 3D display at a plurality of positions according to an embodiment of the present disclosure.
Figure 7B:
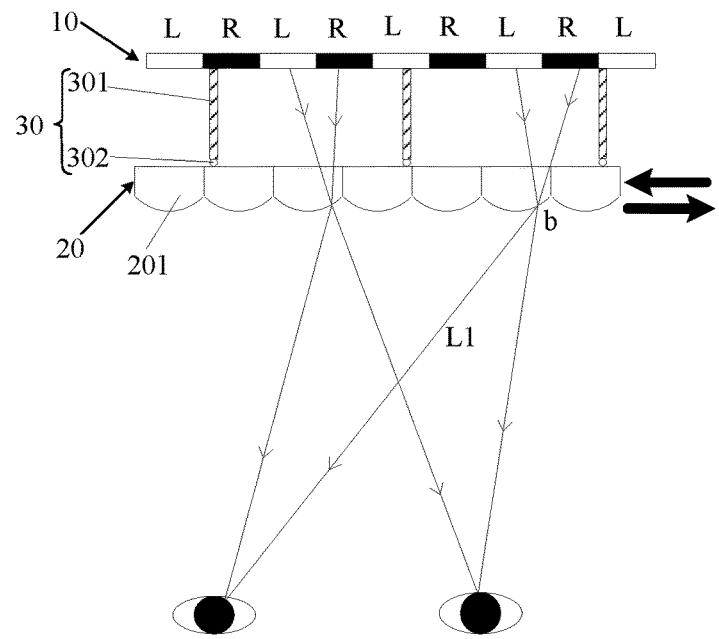
FIG. 7(b) is a second schematic view showing a principle of a 3D display apparatus that achieves the best naked eyes 3D display at a plurality of positions according to an embodiment of the present disclosure.

In an example, as shown in FIG. 7(a) and FIG. 7(b), if the adjusting device 30 causes the cylindrical lens grating 20 to move towards the right from the position shown in FIG. 7(a) to the position shown in FIG. 7(h), the light L1 changes from a position a where it is directed into the cylindrical lens 201 to a position b where it is directed into the cylindrical lens 201. For the position a and the position b where the light emitted from the display panel 10 is directed into the cylindrical lens 201, the light has different refraction directions. Thus, in movement, the cylindrical lens grating 20 may cause the light emitted from the display panel 10 to direct towards different positions of eyes of the human.

An embodiment of the present disclosure provides a 3D display apparatus. The 3D display apparatus includes an adjusting device 30 and the rotatable portion 302 in the adjusting device 30 is engaged with the member (the display panel 10 or the grating 20). Thus, when the rotatable portion 302 in the adjusting device 30 rotates, the rotatable portion 302 may drive the display panel 10 or the grating 20 to move in a direction along which the bars of the grating 20 are arrayed. In this way, the relative position between the display panel 10 and the grating 201 may be adjusted, such that the exit direction of the light emitted from the display panel 10 after it passes through the grating 20 may be changed. It may cause the light emitted from the display panel 10 to be directed to different positions of the eyes of the human, so as to achieve the best naked eyes 3D display at the different positions to improve the user's experiences.

As an example, the adjusting device 30 includes a MEMS (micro-electromechanical system) adjusting device.

It should be noted that MEMS is an industrial technology that combines microelectronic technology and mechanical engineering together. The structure formed by the MEMS technology typically has a size of micrometer level, even nanometer level.

In an embodiment of the present disclosure, the adjusting device 30 may be a MEMS adjusting device and the MEMS adjusting device includes a MEMS supporting portion, a MEMS rotatable portion and a MEMS driving portion. Since all of the MEMS supporting portion, the MEMS rotatable portion and the MEMS driving portion have sizes of micrometer level or nanometer level, provision of the MEMS supporting portion, the MEMS rotatable portion and the MEMS driving portion in the 3D display apparatus will not influence normal display of the 3D display apparatus.

As an example, as shown in FIG. 6(*a*) and FIG. 6(*b*), the supporting portion 301 and the rotatable portion 302 in the adjusting device 30 are arranged between the display panel 10 and the grating 20. Or as shown in FIG. 6(*c*), the adjusting device 30 is arranged below the member to be moved such that the member is engaged with the rotatable portion 302 in the adjusting device 30 by gravity.

It should be noted that when the supporting portion 301 and the rotatable portion 302 in the adjusting device 30 are arranged between the display panel 10 and the grating 20, it Should ensure the rotatable portion 302 to contact with the display panel 10 or the grating 20 and the friction force produced when the rotatable portion 302 rotates may drive the display panel 10 or the grating 20. In view of this, in order to ensure the friction force produced by the member with the rotatable portion 20 may drive the member to move when the rotatable portion 20 rotates, a force towards the rotatable portion 20 needs also to be applied on the display panel 10 or the grating 20. In view of this, the rotatable portion 302 may contact with the grating 20 to move the grating 20; the rotatable portion 302 may also contact with the display panel 10 to move the display panel 10.

In the embodiment, when the adjusting device 30 is arranged below the member to be moved, the adjusting device 30 may be arranged below the display panel 10 to move the display panel 10; and the adjusting device 30 may also be arranged below the grating 20 to move the grating 20.

In the embodiment of the present disclosure, the supporting portion 301 and the rotatable portion 302 in the adjusting device 30 are arranged between the display panel 10 and the grating 20, which may reduce the size of a frame of the 3D display apparatus. The adjusting device 30 is arranged below the member to be moved. In this way, it does not need to apply a force onto the display panel 10 or the grating 20 and it may simplify the structure of the 3D display apparatus.

Further, in case that the supporting portion 301 and the rotatable portion 302 in the adjusting device 30 are arranged between the display panel 10 and the grating 20 and the adjusting device 30 includes the substrate, if the member to be moved is the display panel 10, the substrate will be the grating 20; or if the member to be moved is the grating 20, the substrate will be the display panel 10.

In the embodiment, when the member is the display panel 10 and the substrate is the grating 20, it is not intended to limit how the supporting portion 301 and the grating 20 are fixed, for example, they may fixed by OCA (optically clear adhesive). As such, when the member is the grating 20 and the substrate is the display panel 10, the supporting portion 301 may also be fixed to the display panel 10 by OCA.

In an embodiment of the present disclosure, when the adjusting device 30 includes the substrate 303 and the adjusting device 30 further includes a plurality of supporting portions 301 arranged on the substrate 303, the plurality of supporting portions 301 may cause the member to move rapidly and stably, to prevent the member from being inclined in movement. On a basis of this, the display panel 10 or the grating 20 may be used to act as the substrate 303 of the adjusting device 30 to simplify the structure of the 3D display apparatus.

As an example, in case that the supporting portion 301 and the rotatable portion 302 in the adjusting device 30 are arranged between the display panel 10 and the grating 20, the supporting portion 301 and the rotatable portion 302 in the adjusting device 30 are arranged at a pixel definition region 11 of the display panel 10.

When the display panel 10 is a LCD display panel, the LCD display panel includes a light transmission region and a light non-transmission region and the pixel definition region 11 means the light non-transmission region of the liquid crystal display panel. When the display panel 10 is an OLED display panel, the OLED display panel includes a light emitting region and a light non-emitting region and the pixel definition region 11 means the light non-emitting region of the OLED display panel.

In the embodiment of the present disclosure, the supporting portion 301 and the rotatable portion 302 are arranged at the pixel definition region 11 of the display panel 10, which may reduce blocking effect of the supporting portion 301 and the rotatable portion 302 to the light emitted from the display panel 10.

Figure 8:
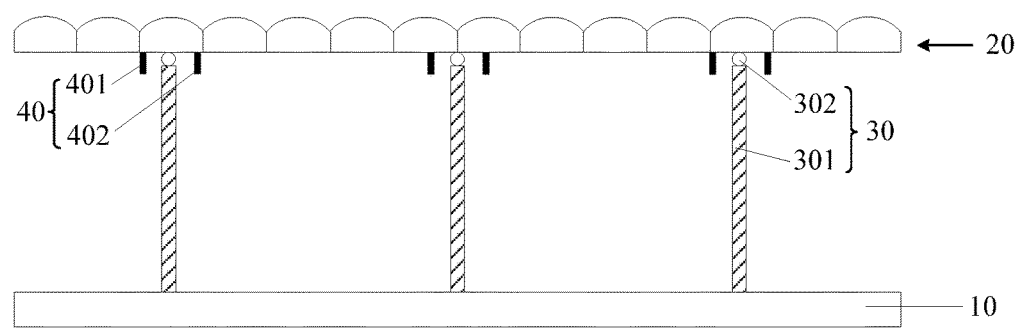
FIG. 8 is a fourth schematic view showing a structure of a 3D display apparatus according to an embodiment of the present disclosure.

As an example, as illustrated in FIG. 8, the 3D display apparatus may further include a stopper 40 arranged on a side of the member engaged with the adjusting device 30 and the supporting portion 301 of the adjusting device 30 is positioned in a moving range limited by the stopper 40.

It is not intended to limit the structure of the stopper 40. The stopper 40 may be closed, or may be a plurality of sub-parts separated from each other. In view of this, it is not intended to limit the moving range defined by the stopper 40. The moving range may be provided reasonably as required.

Further, when the member is the display panel 10, the stopper 40 is arranged on the display panel 10. When the member is the grating 20, the stopper 40 is arranged on the grating 20.

In the embodiment of the present disclosure, the 3D display apparatus includes the stopper 40 arranged on the member, thus the stopper 40 may cause the member to move in the range defined by the stopper 40 to prevent the member from impacting the frame of the display apparatus due to too large moving range or prevent the display panel 10 from being misaligned with the grating 20 due to too large moving range. It can ensure the naked eyes 3D display to be achieved.

In a further embodiment, as shown in FIG. 8, the stopper 40 may include a first sub-stopper 401 and a second sub-stopper 402 arranged on both sides of the supporting portion 301 respectively in the direction along which the bars of the grating 20 are arrayed, and a spacing between the first sub-stopper 401 and the second sub-stopper 402 is equal to a pitch of the grating 20.

Further, it is not intended to limit the structures of the first sub-stopper 401 and the second sub-stopper 402 as long as they can limit the member to move in a predetermined range. For example, the first sub-stopper 401 and the second sub-stopper 402 may be barrier plates.

In an embodiment of the present disclosure, the bars of the grating 20 are arrayed periodically in repetition and the light emitted from the display panel 10 has exit direction which varies as the position of one bar that the light passes changes. For different bars, the lights that exit from the same position on different bars have the same exit direction. Thus, by means of moving the display panel 10 or the grating 20 in a range of a pitch (i.e., width of one bar) of the grating 20, the exit direction of the light emitted from the display panel 10 may be adjusted. In view of this, the spacing between the first sub-stopper 401 and the second sub-stopper 402 is equal to the pitch of the grating 20, that is, the display panel 10 or the grating 20 moves in the range of the pitch of the grating 20. In this way, the display panel 10 or the grating 20 may have a minimum moving range such that there is minimum gap between the display panel 10 and the grating 20 and the frame of the display apparatus.

Figure 9:
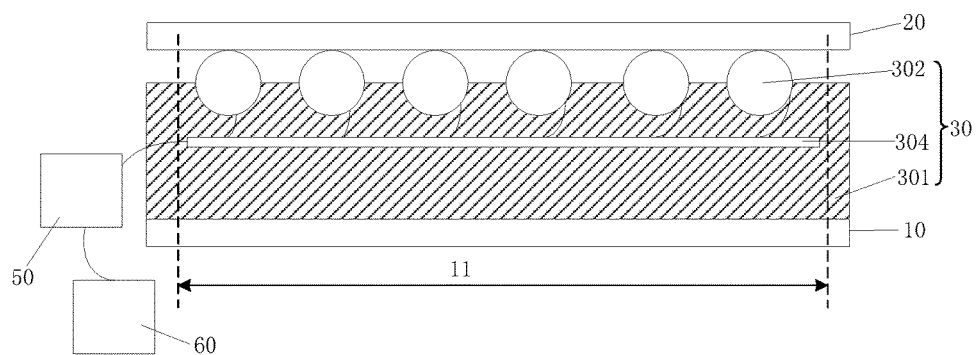
FIG. 9 is a fifth schematic view showing a structure of a 3D display apparatus according to an embodiment of the present disclosure.

In an example, as shown in FIG. 9, the 3D display apparatus includes a controller 50, which is connected to the driving portion 304 and configured to control the driving portion 304 to drive the rotatable portion 302 to rotate.

In an example, the controller 50 may control rotating orientation and number of turns of rotatable portion 302 which is driven by the driving portion 304. Further, before or after the display panel 10 or the grating 20 moves, the current positions of both the display panel 10 and the grating 20 may be stored in the controller 50.

In an embodiment of the present disclosure, the 3D display apparatus includes a controller 50. The controller 50 may control the rotating orientation and number of turns of the rotatable portion 302 driven by the driving portion 304 accurately, so as to control the moving distance between the display panel 10 and the grating 20.

Further, as illustrated in FIG. 9, the 3D display apparatus further includes a camera 60, which is configured to trace a position of an eye of a human and connected to the controller 50. The controller 50 can calculate a moving orientation and a moving distance required for the grating 20 or the display panel 10, on a basis of the position of the eye traced by the camera 60 and the current positions of the grating 20 and the display panel 10, to obtain a rotating orientation and number of turns of the rotatable portion 302.

It is not intended to limit the position of the camera 60 as long as it can easily trace the position of the eye of the human.

For example, the central points of eye balls of the left eye and the right eye of the human may be regarded as the positions of the left eye and the right eye of the human.

It should be noted that a vertical distance between the eye of the human and the grating 20 may be calculated on a basis of the acquired position of the eye and the relative position between the display panel 10 and the grating 20 when the visual pictures of the left eye and the right eye at the current positions of eyes of the human are separated from each other may also be calculated. Since the current positions of the grating 20 and the display panel 10 are also acquired, the moving orientation and moving distance required for the grating 20 or the display panel 10 may be calculated on the basis of the acquired current positions of the grating 20 and the display panel 10 and the calculated relative positions of the display panel 10 and the grating 20 when the visual pictures of the left eye and the right eye at the current positions of eyes of the human are separated from each other.

When the 3D display is performed, once the camera 60 traces the position of the eye of the human, the camera 60 sends a signal to the controller 50. The controller 50 calculates the moving orientation and moving distance required for the grating 20 or the display panel 10 on the basis of the current positions of the grating 20 and the display panel 10 and the position of the eye traced by the camera 60, and further converts the moving orientation and moving distance into the rotating orientation and number of turns of the rotatable portion 302. Then, the controller 50 transmits the signal to the driving portion 304 and the driving portion 304 drives the rotating portion 302 to rotate on the basis of the acquired rotating orientation and number of turns of the rotatable portion 302.

In the embodiment of the present disclosure, the position of the eye may be traced in real time by the camera 60. By means of adjusting the relative position of the grating 20 and the display panel 10 by the adjusting device 30, the lights emitted from the display panel 10 are directed to the positions of the eyes of the human after the lights pass through the grating 20 (the left eye and the right eye have different visual pictures), such that the positions of the eyes are located at the best positions of 3D display, to improve the user's experiences.

Figure 10:
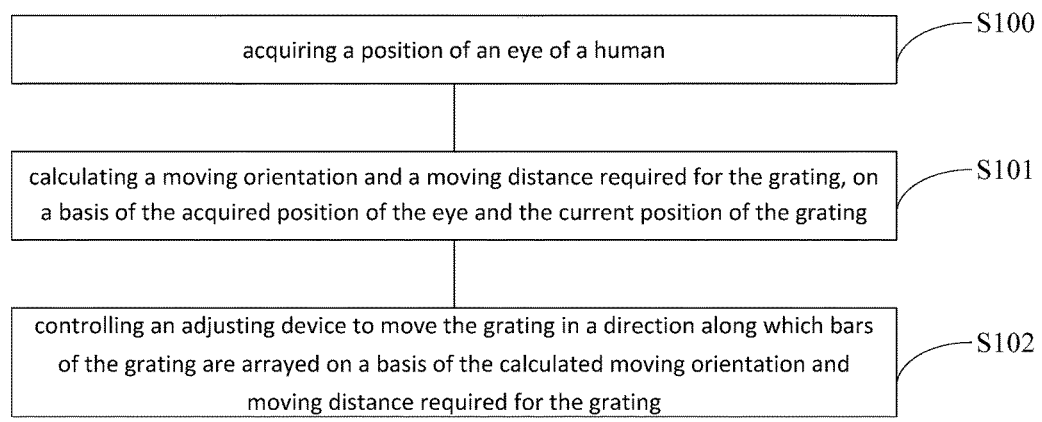
FIG. 10 is a flow chart schematically showing a method for controlling a 3D display apparatus according to an embodiment of the present disclosure.

An embodiment of the present disclosure also provides a method for controlling a 3D display apparatus. As shown in FIG. 10, the method includes:

S100 of acquiring a position of an eye of a human.

In an example, the central points of eye balls of the left eye and the right eye of the human may be regarded as the positions of the left eye and the right eye of the human.

Further, it is not intended to limit how to acquire the positions of the eyes, for example, the positions of the eyes of the human may be acquired by the camera 60.

S101 of calculating a moving orientation and a moving distance required for the grating 20 or the display panel 10, on a basis of the acquired position of the eye and the current positions of the grating 20 and the display panel 10.

In an example, the positions of the display panel 10 and the grating 20 before they move and positions of the display panel 10 and the grating 20 after they move may both be stored in the 3D display apparatus.

It should be noted that a vertical distance between the eye of the human and the grating 20 may be calculated on a basis of the acquired position of the eye, and the relative position between the display panel 10 and the grating 20 when the visual pictures of the left eye and the right eye at the current positions of eyes of the human are separated from each other may also be calculated. Since the current positions of the grating 20 and the display panel 10 are also acquired, the moving orientation and moving distance required for the grating 20 or the display panel 10 may be calculated on the basis of the acquired current positions of the grating 20 and the display panel 10 and the calculated relative position of the display panel 10 and the grating 20 when the visual pictures of the left eye and the right eye at the current positions of eyes of the human are separated from each other.

S102 of controlling the grating 20 or the display panel 10 to move in a direction along which bars (such as cylindrical lens) of the grating 20 (such as cylindrical lens grating) are arrayed on a basis of the calculated moving orientation and moving distance required for the grating 20 or the display panel 10.

Further, the grating 20 or the display panel 10 is controlled to move in the direction along which the bars of the grating 20 are arrayed on the basis of the calculated moving orientation and moving distance required for the grating 20 or the display panel 10, so as to adjust the lights emitted from the display panel 10 to be directed to the positions of the eyes (in the example, the left eye and the right eye have different visual pictures) after they pass through the grating 20.

An embodiment of the present disclosure provides a method for controlling a 3D display apparatus. On the basis of the acquired positions of eyes of the human and the current positions of the grating 20 and the display panel 10, the moving orientation and moving distance required for the grating 20 or the display panel 10 may be calculated and the grating 20 and the display panel 10 are controlled to move in the direction along which the bars of the grating 20 are arrayed, such that the relative position between the display panel 10 and the grating 201 can be adjusted, so as to cause the light emitted from the display panel 10 to be directed to the positions of the eyes (in the example, the left eye and the right eye have different visual pictures) after the lights pass through the grating 20. In this way, the best naked eyes 3D display can be achieved at the positions of the eyes of the human to improve the user's experiences.

As an example, the method for controlling the 3D display apparatus according to the embodiment of the present disclosure may be used in the 3D display apparatus provided by the embodiment of the present disclosure. The camera 60 in the 3D display apparatus provided by the embodiment of the present disclosure may acquire the position of eyes. On the basis of the positions of the eyes acquired by the camera 60 and the current positions of the grating 20 and the display panel 10, the controller 50 may calculate the moving orientation and moving distance required for the grating 20 or the display panel 10 and control the rotatable portion 302 in the adjusting device 30 to rotate, so as to drive the grating 20 or the display panel 10 to move in the direction along which the bars of the grating 20 are arrayed.

The adjusting device, the 3D display apparatus and the method for controlling the 3D display apparatus provided by the embodiments of the present disclosure may adjust the display panel or the grating to move, so as to adjust the direction of the light exiting the grating such that the 3D display apparatus can achieve the best naked eye 3D display can be achieved at a plurality of positions.

The above embodiments are exemplary embodiments of the present disclosure, instead of limiting the protection scope of the present disclosure. All of modifications or alternatives that can be easily envisaged by the skilled person in the art without departing from the principles and spirit of the disclosure should fall within the protection scope of the present disclosure. The protection scope of the present disclosure should be defined by the appended claims and equivalents thereof.

What is claimed is:

1. A three-dimensional (3D) display apparatus comprising:
    a display panel;
    a grating composed of bars and arranged on a light exit side of the display panel; and
    an adjusting device configured to adjust a position of a member to be moved in a display apparatus, the adjusting device comprising:
        a supporting portion which has a groove on a side of the supporting portion adjacent to the member to be moved;
        a rotatable portion which is partly embedded in the groove of the supporting portion and is rotatable in the groove; and
        a driving portion configured to drive the rotatable portion to rotate,
    wherein the rotatable portion in the adjusting device is engaged with the member such that the rotatable portion drives the member to move in a direction along which the bars of the grating are arrayed, and wherein the member is the display panel or the grating, and
    wherein the three-dimensional display apparatus further comprises a stopper arranged on a side of the member engaged with the adjusting device and the supporting portion of the adjusting device is positioned in a moving range limited by the stopper and wherein the stopper comprises a first sub-stopper and a second sub-stopper arranged on both sides of the supporting portion respectively in the direction along which the bars of the grating are arrayed, and wherein a spacing between the first sub-stopper and the second sub-stopper is equal to a pitch of the grating.

2. The three-dimensional display apparatus according to claim 1, wherein the adjusting device comprises a micro-electromechanical system adjusting device.

3. The three-dimensional display apparatus according to claim 1, wherein the adjusting device comprises a plurality of the supporting portions spaced apart from each other, and at least one rotatable portion is embedded into each of the supporting portions; and
    wherein the adjusting device further comprises: a substrate on which the plurality of the supporting portions are fixed.

4. The three-dimensional display apparatus according to claim 1, wherein the adjusting device is provided below the member such that the member is engaged with the rotatable portion in the adjusting device by gravity.

5. The three-dimensional display apparatus according to claim 1, wherein the supporting portion and the rotatable portion in the adjusting device are arranged between the display panel and the grating.

6. The three-dimensional display apparatus according to claim 5, wherein the adjusting device comprises a substrate, and wherein one of the member and the substrate is the display panel, the other of them is the grating.

7. The three-dimensional display apparatus according to claim 6, wherein the supporting portion and the rotatable portion in the adjusting device are arranged at a pixel definition region of the display panel.

8. The three-dimensional display apparatus according to claim 1, wherein the 3D display apparatus comprises a controller, which is connected to the driving portion and configured to control the driving portion to drive the rotatable portion to rotate.

9. The three-dimensional display apparatus according to claim 8, wherein the 3D display apparatus further comprises a camera, which is configured to trace a position of an eye of a human and connected to the controller, and
    wherein the controller is configured to calculate a moving orientation and a moving distance required for the grating or the display panel, on a basis of the position of the eye traced by the camera and the current positions of the grating and the display panel, to obtain a rotating orientation and number of turns of the rotatable portion.

10. A method for controlling the three-dimensional display apparatus of claim 1, comprising:
    acquiring a position of an eye of a human;
    calculating a moving orientation and a moving distance required for a grating or a display panel, on a basis of the acquired position of the eye and the current positions of the grating and the display panel; and
    controlling the grating or the display panel to move in a direction along which bars of the grating are arrayed on a basis of the calculated moving orientation and moving distance required for the grating or the display panel.

* * * * *